(12) United States Patent
Chou

(10) Patent No.: US 7,990,607 B2
(45) Date of Patent: Aug. 2, 2011

(54) SOLID-STATE LIGHT SOURCE BASED ILLUMINATION APPARATUS AND PROJECTION SYSTEM HAVING SAME

(75) Inventor: Shih-Chieh Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 860 days.

(21) Appl. No.: 12/019,878

(22) Filed: Jan. 25, 2008

(65) Prior Publication Data
US 2009/0052014 A1 Feb. 26, 2009

(30) Foreign Application Priority Data

Aug. 22, 2007 (CN) .......................... 2007 1 0201435

(51) Int. Cl.
*H01S 3/00* (2006.01)
(52) U.S. Cl. .......................................... 359/333; 385/71
(58) Field of Classification Search .................. 359/349, 359/334, 333; 385/71
See application file for complete search history.

(56) References Cited

U.S. PATENT DOCUMENTS

| 6,796,689 B2 * | 9/2004 | Dho ............................... 362/393 |
| 7,034,992 B2 * | 4/2006 | Komine .......................... 359/334 |
| 7,286,296 B2 * | 10/2007 | Chaves et al. .................. 359/641 |
| 2005/0078353 A1 * | 4/2005 | Komine .......................... 359/334 |
| 2005/0201675 A1 * | 9/2005 | Knopp et al. .................... 385/27 |

FOREIGN PATENT DOCUMENTS

| CN | 1447321 A | 10/2003 |
| JP | 2005114914 A | 4/2005 |

* cited by examiner

*Primary Examiner* — Mark Hellner
(74) *Attorney, Agent, or Firm* — Jeffrey T. Knapp

(57) ABSTRACT

An exemplary illumination apparatus for use in a projection system includes a number of solid-state light sources and first non-imaging collection optics, a power coupler, an optical amplifier, and a second non-imaging collection optic. The solid-state light sources are configured to generate light of a predetermined wavelength. Each first non-imaging collection optic is configured to collect and transmit light from a respective solid-state light source to the power coupler. The power coupler is configured to combine light from the solid-state light sources. The optical amplifier is configured to amplify the combined light. The second non-imaging collection optic is configured to collect the amplified light to provide illumination.

11 Claims, 1 Drawing Sheet

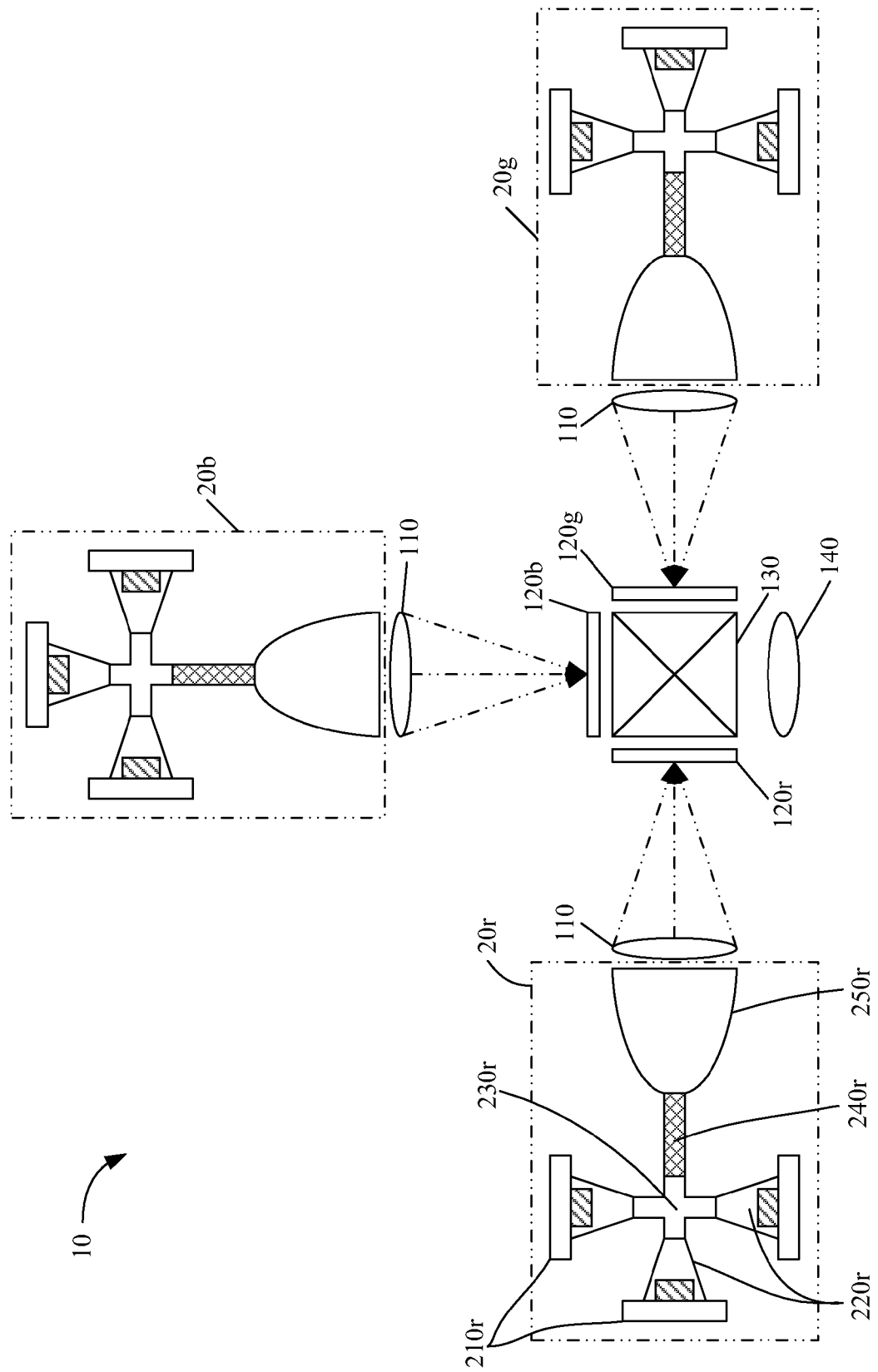

SOLID-STATE LIGHT SOURCE BASED ILLUMINATION APPARATUS AND PROJECTION SYSTEM HAVING SAME

BACKGROUND

1. Technical Field

The invention relates to illumination apparatuses for use in projection technology and, in particular, relates to a solid-state light source based illumination apparatus, and a projection system using same.

2. Description of Related Art

Solid-state light sources such as light emitting diodes (LED) or laser diodes (LD) have been proposed to replace traditional arc lamps such as high pressure mercury, metal halide, or xenon in projection systems such as digital light processing (DLP) projectors or liquid crystal display (LCD) projectors, since these solid-state light sources have the following advantages, as compared to the arc lamps: longer life, better color gamut, lower cost, lower power consumption, decreased cooling requirement, and freedom from mercury relative to environmental hazard. However, one of the challenges of utilizing such a solid-state light source in a projection system is: current solid-state light sources do not provide sufficient luminance.

Therefore, it is desirable to provide a solid-state light source based illumination apparatus, and a projection system, which can overcome the abovementioned problem.

SUMMARY

In a present embodiment, an illumination apparatus for use in a projection system includes a number of solid-state light sources and first non-imaging collection optics, a power coupler, an optical amplifier, and a second non-imaging collection optic. The solid-state light sources are configured to generate light of a predetermined wavelength. Each first non-imaging collection optic is configured to collect and transmit light from a respective solid-state light source to the power coupler. The power coupler is configured to combine light from the solid-state light sources. The optical amplifier is configured to amplify the combined light. The second non-imaging collection optic is configured to collect the amplified light to provide illumination.

BRIEF DESCRIPTION OF THE DRAWING

The FIGURE is a schematic view of a projection system, according to an exemplary embodiment.

DETAILED DESCRIPTION OF THE EMBODIMENTS

Embodiments of the present illumination apparatus and projection system will now be described in detail with reference to the drawing.

Referring to the FIGURE, a projection system 10 in accordance with an exemplary embodiment is a LCD-based projector, and includes three illumination apparatuses 20r, 20g, 20b, three condensing lenses 110, three LCD panels 120r, 120g, 120b (light modulator), a prism 130, and a projection lens 140. Each illumination apparatus 20r/20g/20b is configured to generate a unique color illumination such as red (R) (wavelength band: 620~760 nm), green (G) (500~578 nm), or blue (B) (446~464 nm) respectively. Each condensing lens 110 is configured to condense the color illumination from a respective illumination apparatus 20r/20g/20b and focus it onto a respective light modulator 120r/120g/120b. Each LCD panel 120r/120g/120b is configured to modulate color light to a respective color component of a visual image, based on input video/television signals. The prism 130 (e.g., X-cube) is configured to synthesize the modulated color components into the visual image. The projection lens 140 is configured to project the visual image onto a screen or the like.

It should be noted that the projection system is not limited to this embodiment, but can employ only one illumination apparatus, one light modulator, and one projection lens (the simplest structure). Furthermore, the projector also may conform to other configurations employing a, e.g., black-white type LCD projector (in this type, the illumination apparatus employed can be the three color apparatuses combined to produce white illumination), DLP color projector (including triple-panel and single panel types), DLP black-white projector, liquid crystal on silicon (LCOS) color projector, or LCOS black-white projector.

The illumination apparatus 20r includes three solid-state light sources 210r, three first non-imaging collection optics 220r, a power coupler 230r, an optical amplifier 240r, and a second non-imaging collection optic 250r. The solid-state light sources 210r are configured to generate R light (in this case R=red). Each first non-imaging collection optic 220r has an input end, and an output end. The power coupler 230r (e.g., 1×3 fiber splitter/coupler) has three inputs, and an output. Each first non-imaging collection optic 220r has its input end sealed to a respective solid-state light source 210r and its output end sealed to a respective input of the power coupler 230r so as to efficiently collect and direct R light from the solid-state light source 210r to the power coupler 230r. The power coupler 230r is configured to couple R light from the inputs (from the solid-state light sources 210r, via the first non-imaging collection optics 220r) thereof into the optical amplifier 240r (via the output thereof). The optical amplifier 240r is configured to amplify the combined R light. The second non-imaging collection optic 250r is configured to collect the amplified R light and thereby form a homogenized R light to be condensed by the condensing lens 110 and modulated by the LCD panels 120r, 120g, 120b.

The solid-state light sources 210r can be R LED dies, arrays of R LED dies, R LD dies, or arrays of LD dies. In this embodiment, the solid-state light sources 210r are R LED dies.

The first non-imaging collection optic 220r is a compound parabolic concentrator (CPC) that has one end matching with the LED die and another end matching with the input of the power coupler 230r in size, and is opportunely made of a dielectric material having properties of low absorption over the spectral range of R light along with excellent thermal and mechanical performance, e.g., acrylic, or polycarbonate.

The optical amplifier 240r can be a laser amplifier, and doped fiber amplifier, semiconductor optical amplifier, Raman amplifier, or optical parametric amplifier. In this embodiment, the optical amplifier 140r is a doped fiber amplifier for amplify R light (the doped medium can be pumped to produce gain for R light).

The second non-imaging collection optic 250r is a CPC too, but has one end matching with the doped fiber amplifier, and another enlarged end acting as surface light source to provide homogenized illumination.

It should be understood that the number of the solid-sate light sources 210r is not limited to three, but could be two or more than three solid-state light sources depending on the illumination requirement of the user.

It should be noted that all the components such as first non-imaging collection optics 220r, power coupler 230r, optical amplifier 240r, and second non-imaging collection optic 250r are designed so as to be capable of manipulating R light with low attenuation at the wavelength band of R light.

The illumination apparatuses 20g, 20b are essentially similar to the illumination apparatus 20r except the working wavelength thereof.

The illumination apparatus can provide desirable high illumination by efficiently coupling light from a required number of solid-state light sources using a 1×N fiber splitter/coupler (N is the number of outputs) and amplifying the coupled light using an optical amplifier, and therefore is advantageous as compared with the conventional arc lamp based and other LED based illumination apparatuses.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. An illumination apparatus for use in a projection device comprising:
    a plurality of solid-state light sources configured to generate light of a predetermined wavelength;
    a power coupler configured to combine the light from the plurality of solid-state light sources;
    a plurality of first non-imaging collection optics each configured to collect and transmit the light from a respective solid-state light source to the power coupler;
    an optical amplifier configured to amplify the combined light from the power coupler; and
    a second non-imaging collection optic configured to collect the amplified light to provide illumination.

2. The illumination apparatus as claimed in claim 1, wherein the solid-state light sources are selected from the group consisting of: light emitting diode dies, arrays of light emitting diode dies, and laser diode dies, and arrays of laser diode dies.

3. The illumination apparatus as claimed in claim 1, wherein the first non-imaging collection optics includes a compound parabolic concentrator.

4. The illumination apparatus as claimed in claim 1, wherein the first non-imaging collection optics are made of a dielectric material selected from the group consisting of: acrylic, and polycarbonate.

5. The illumination apparatus as claimed in claim 1, wherein power coupler is a 1×N fiber splitter/coupler.

6. The illumination apparatus as claimed in claim 1, wherein the optical amplifier is selected from the group consisting of: a laser amplifier, and a doped fiber amplifier.

7. The illumination apparatus as claimed in claim 1, wherein the optical amplifier is selected from the group consisting of: a semiconductor optical amplifier, a Raman amplifier, and an optical parametric amplifier.

8. The illumination apparatus as claimed in claim 1, wherein the second non-imaging collection optic is a compound parabolic concentrator.

9. The illumination apparatus as claimed in claim 1, wherein the second non-imaging collection optic are made of a dielectric material selected from the group consisting of: acrylic, and polycarbonate.

10. A projection system comprising:
    an illumination apparatuses configured to generate an illumination, comprising:
    a plurality of solid-state light sources configured to generate light of a predetermined wavelength;
    a power coupler configured to combine the light from the plurality of solid-state light sources;
    a plurality of first non-imaging collection optics each configured to collect and transmit the light from a respective solid-state light source to the power coupler;
    an optical amplifier configured to amplify the combine light from the power coupler; and
    a second non-imaging collection optic configured to collect the amplified light to provide illumination;
    a light modulators each configured to modulate the illumination to produce a visual image; and
    a projection lens configured to project the visual image.

11. The projection system as claimed in claim 10, being selected from the group consisting of: a digital light processing projection system, a liquid crystal display projection system, and a liquid crystal on silicon projection system.

* * * * *